United States Patent [19]
Boynton

[11] 3,993,235
[45] Nov. 23, 1976

[54] DIFFERENTIAL PRESSURE WAVE SOLDERING SYSTEM

[75] Inventor: Kenneth G. Boynton, Milford, N.H.

[73] Assignee: Hollis Engineering, Inc., Nashua, N.H.

[22] Filed: Sept. 2, 1975

[21] Appl. No.: 609,239

[52] U.S. Cl............................ 228/37; 228/180 R; 228/257; 228/260; 118/410
[51] Int. Cl.² ........................................ B23K 3/06
[58] Field of Search............... 228/257, 260, 180 R, 228/37; 118/410; 427/96, 433

[56] References Cited
UNITED STATES PATENTS

| | | | |
|---|---|---|---|
| 3,004,505 | 10/1961 | Dvorak | 228/37 X |
| 3,207,128 | 9/1965 | Leavitt et al. | 228/37 X |
| 3,217,959 | 11/1965 | Renzo | 228/37 |
| 3,398,873 | 8/1968 | Wegener et al. | 228/37 |
| 3,713,876 | 1/1973 | Lavric | 228/37 X |

FOREIGN PATENTS OR APPLICATIONS

| | | | |
|---|---|---|---|
| 1,099,330 | 1/1968 | United Kingdom | 228/37 |

Primary Examiner—Al Lawrence Smith
Assistant Examiner—K. J. Ramsey
Attorney, Agent, or Firm—Schiller & Pandiscio

[57] ABSTRACT

A mass soldering system is described in which a standing wave of molten solder is formed. The solder wave is characterized by having a substantially horizontal crest, and the wave has varying pressures along its flow path. In a preferred embodiment of the invention the wave pressures are varied to produce a wave having increasing pressure along its flow path whereby a substantially uni-directional wave may be formed which is highest adjacent its rear.

12 Claims, 3 Drawing Figures

DIFFERENTIAL PRESSURE WAVE SOLDERING SYSTEM

The present invention relates to systems for soldering electrical and electronic components onto substrate circuit boards, and more specifically to systems for mass soldering components onto printed circuit boards using solder wave techniques.

Numerous soldering systems have been proposed in the art using a standing wave of solder, and are widely used commercially. A typical prior art system comprises a reservoir for molten solder and a sump partially submerged in the reservoir. The sump has an intake orifice adjacent its lower end, and an elongate nozzle or slot adjacent the sump top end. A positive displacement pump is submerged in the body of the solder and is adapted to force molten solder into the sump orifice and upwardly in the sump and overflows on both sides of the nozzle to thereby provide a smoothly rounded standing wave of molten solder at the nozzle. While such known wave soldering systems have provided substantial improvements in the mass soldering of components to circuit boards, a problem which sometimes occurs using such known soldering systems is the formation of icicles of solder extending from the connections on the finished board. In order to overcome this latter problem the art has proposed various systems for deflecting the flow of solder in the wave in a single direction, passing the board e.g. as by providing an inclined lip or wall extending upwardly on one side of the nozzle, and the board is then passed in contact with the wave in a direction opposite to the direction of wave travel. See for example U.S. Pat. Nos. 3,037,274, 3,379,356, 3,407,984 and 3,605,244. While such patented systems are said to reduce the formation of icicles of solder in some situations, the upwardly extending lip or wall on the side of the nozzle may occassionally interfere with the movement of boards through the system.

It is thus an object of the present invention to provide a wave soldering system which overcomes the aforesaid problems of the prior art, and which system can produce a solder wave having a substantially horizontal crest and predetermined shape. Another object is to provide such a system in which the wave has differential pressures and heights.

Still other objects will in part appear obvious and will in part appear hereinafter.

The invention accordingly comprises the processes involving the several steps and relative order of one or more of such steps with respect to each other, and the apparatus possessing the features, properties and relations of elements which are exemplified in the following detailed disclosure and the scope of the application of which will be incidated in the claims.

Generally, the present invention involves a mass soldering system which includes a soldering machine in which the sump comprises two or more interior chambers and a common nozzle. The chambers are separated from one another within the sump by one or more substantially vertical baffles or walls, extending substantially parallel to the nozzle opening or slot. Means are provided for supplying molten solder into the various chambers in the sump under selected different pressures whereby the solder wave which emerges from the nozzle may have predetermined differential pressures along its wave form or shape.

For a fuller understanding of the objects of the present invention, reference should be had to the following detailed description taken in connection with the accompanying drawing in which.

Figure 1:
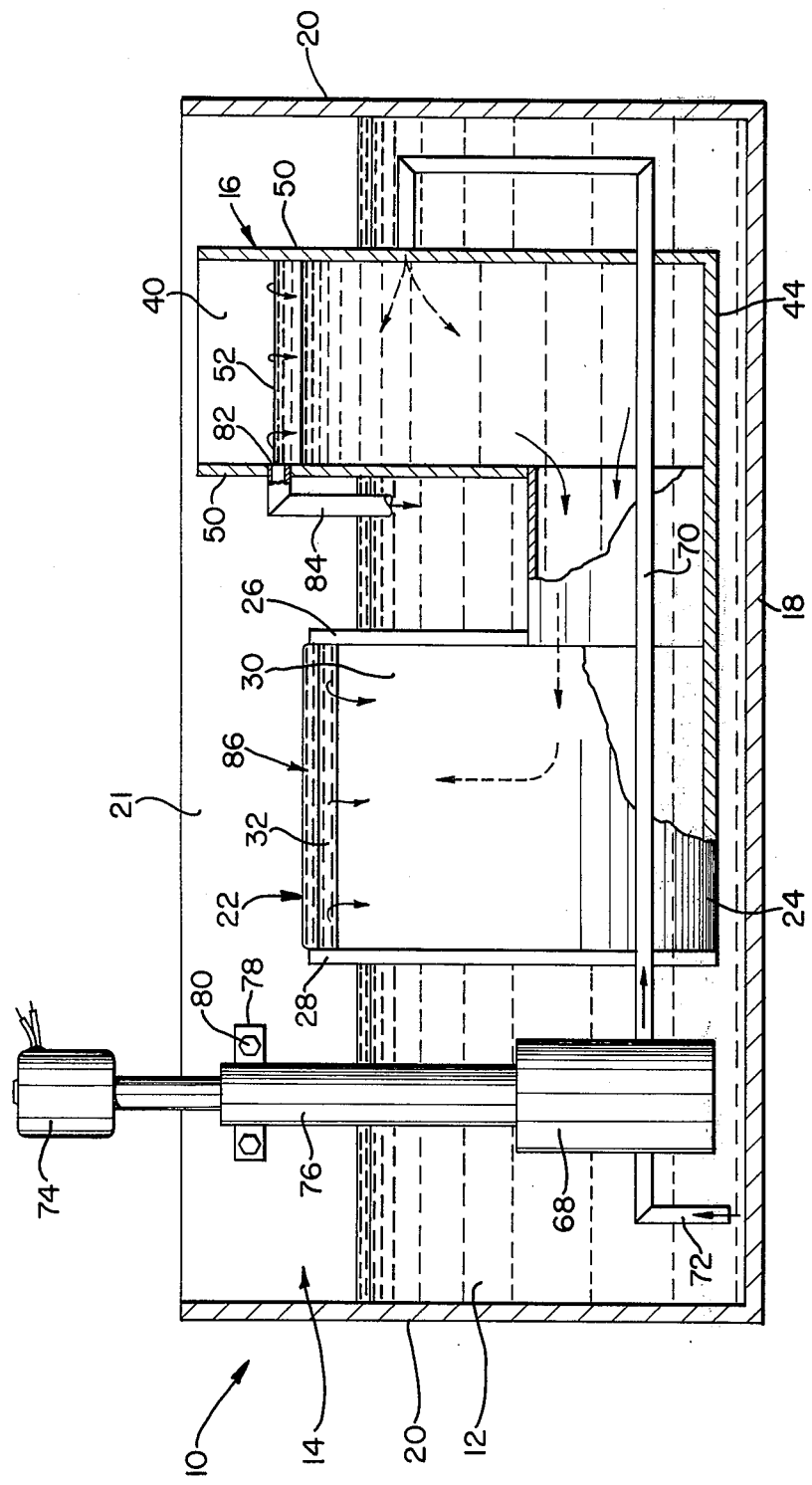
FIG. 1 is a side elevational view, partly in section, and showing a preferred embodiment of soldering apparatus of the present invention.

Referring now to the drawings, the illustrated apparatus includes a container indicated generally at 10 for holding a supply of molten solder 12. Container 10 comprises a main first reservoir compartment 14 and a second reservoir compartment 16. Main reservoir compartment comprises a rectangular container open at its top end, and comprising horizontal bottom wall 18 and vertical end walls 20 and side walls 21. Suitable heating means (not shown) may be secured to the bottom and/or side walls of the main reservoir compartment to heat and maintain the body of solder 12 in a molten state.

A sump and nozzle assembly indicated generally at 22 is disposed interiorly of reservoir compartment 14. The sump and nozzle assembly 22 comprises a rounded bottom wall 24, a pair of substantially vertical opposed end walls 26 and 28, and a pair of inclined side walls 30 and 31. The upper ends of the sump side walls are tapered towards one another to form a narrow elongated rectangular orifice and extend above the solder level in compartment 14 for a suitable distance, e.g. one inch above the molten solder level to form an elongated nozzle or slot indicated generally at 32.

Figure 2:
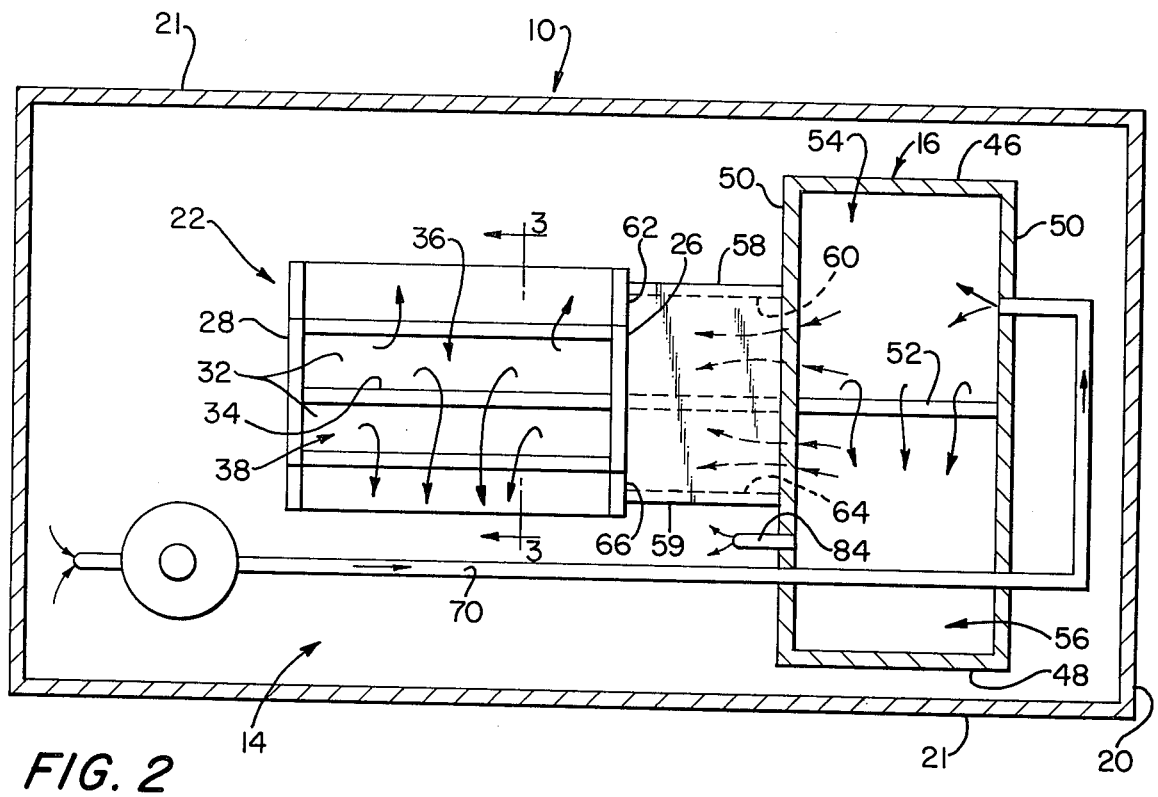
FIG. 2 is a plan view, partly in section of the apparatus shown in FIG. 1.
Figure 3:
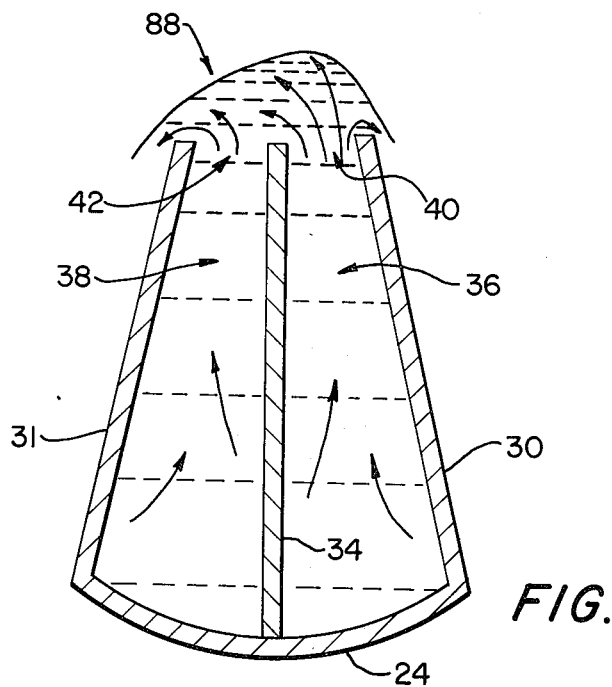
FIG. 3 is a cross-sectional view of the sump and fountain of the present invention taken on line 3 — 3 of FIG. 2.

Sump 22 is partitioned into two or more internal chambers. Referring in particular to FIG. 2 a substantially vertical partition or wall 34 is disposed interiorly of sump 22 to divide the sump into first and second chambers 36 and 38, respectively. Wall 34 extends from sump rounded bottom wall 24 to nozzle 32 and between end walls 26 and 28, substantially parallel to the nozzle opening at 32. Chambers 36 and 38 are open at their top ends 40 and 42, respectively, adjacent nozzle 32.

The sump and nozzle assembly 22 are fixedly positioned within reservoir compartment 14 by suitable means, (not shown).

The second reservoir compartment 16 comprises a rectangular container open at its top end, and comprising a bottom wall 44 opposed vertical sidewalls 46 and 48, and opposed end walls 50. Second reservoir compartment 16 is also partitioned into two or more internal sub-compartments. Referring to FIG. 2, a substantially vertical partition or wall 52 is disposed interiorly of reservoir compartment 16 to divide the reservoir into two sub-compartments 54 and 56, respectively. Wall 52 extends from the reservoir bottom wall 44 and between end walls 50, although wall 52 is somewhat shorter than end wall 50. The second reservoir compartment 16 is fixedly positioned within the first compartment 14 by suitable means (not shown).

A conduit 58 is provided interiorly of reservoir compartment 14 for providing fluid communication between reservior sub-compartment 54 and sump chamber 36. Another conduit 59 is provided interiorly of reservoir compartment 14 for providing fluid communication between reservoir sub-compartment 56 and sump chamber 38. In order to minimize turbulence in the solder wave formed by the apparatus as shown, conduit inlet 60 and outlet 62, and conduit inlet 64 and outlet 66, preferably are disposed adjacent the lower portions of reservoir sub-compartment 54 and sump chamber 36, and reservoir sub-compartment 56 and sump chamber 38, respectively.

Also disposed interiorly of reservoir compartment 14 are means such as pump 68 and conduit 70 for transferring molten solder from reservoir compartment 14 into reservoir 16 sub-compartment 54. In order to minimize turbulence in the solder wave formed by the apparatus as shown, conduit 70 preferably is positioned so as to empty into the upper portion of sub-compartment 54. Pump 70 is of the type well known in the art, and in preferred form comprises a positive displacement pump having a pump having a pump inlet 72 adjacent the bottom of reservoir compartment 14, and a variable speed electric motor 74 disposed exteriorly of reservoir compartment 14. Motor 74 is connected to pump 70 by suitable drive shaft 76, and the motor, drive shaft and pump assembly are fixedly positioned in the system by securing to one of reservoir compartment 14 side walls 21, as by a bracket 78 and bolts 80. Completing the apparatus as shown as in overflow orifice 82 in the upper portion of reservoir sub-compartment 56 inside wall 48, for limiting the solder liquid level in sub-compartment 56, and means such as a conduit 84 for returning any solder overflow to below the surface of solder in reservoir compartment 14. As seen in FIG. 1 orifice 82 should be vertically below the top of wall 52, but the orifice should be vertically above the top of sump side wall 30.

Operation of the soldering system just described is as follows: Reservoir compartment 14 is charged with a quantity of solder. The solder is heated to form a melt. Pump motor 74 is turned on, and the speed of motor is adjusted so that solder is pumped from reservoir compartment 14 to reservoir compartment 16. The solder fills sub-compartment 54 to the top of partition 52 and the solder then overflows partition 52 and fills sub-compartment 56 to the level of overflow orifice 82. As the solder liquid levels in sub-compartments 54 and 56 rise relative to the solder liquid level in compartment 14, liquid solder will also flow from sub-compartments 54 and 56 through conduits 58 and 59 into sump chambers 36 and 38, respectively. The solder will continue to rise in the sump chambers 36 and 38 until the solder level reaches the top of sump side wall 30 at nozzle area 32, and the solder will then cascade over the sump side walls 30 with a smooth, substantially horizontal crest approximately as shown at 86. Since the solder flow derives from the static fluid heads in sub-compartments 54 and 56, and since sub-compartments 54 has a somewhat higher liquid level than sub-compartment 56, the molten solder will flow into sump chamber 36 at a somewhat higher pressure than the flow into chamber 38. Accordingly the solder wave which flows out of nozzle 32 will in turn have different pressures along its wave form and, in the case illustrated, the wave will be highest adjacent the upper (outlet) end of chamber 36, and will tend to fall in the direction of the lower pressure area (adjacent the upper end of chamber 38), approximated as shown at 88.

It will be appreciated that by using the principals of the present invention one can obtain a smooth solder wave which has a substantially horizontal crest, and which wave is inclined to a point highest adjacaent its rear. Obviously the principals of the present invention can be used to produce a wave of any other desired shape and differential pressure characteristics along the wave form or shape.

One skilled in the art will recognize various changes may be made in the above-described invention without departing from the scope of the invention thereof. For example, reservoir 16 and sump 22 may be partitioned into three or more chambers for operating at three or more different pressures. Furthermore, orifice 82 may be vertically adjustable along side 50, i.e. so that the height of the static fluid head in sub-compartment 56 may be adjusted. Similarly, a vertically adjustable orifice may be fitted in wall 52 so that the height of the static fluid head in sub-compartment 54 may also be adjusted. It is also possible to employ several conventional, e.g. positive displacement pumps, to charge the various sump chambers at different pressures. Still other changes will be obvious to one skilled in the art.

What is claimed is:

1. In a wave soldering system comprising a container for holding a supply of molten solder, and a sump and nozzle adapted to be partially submerged in said supply of molten solder, the improvement comprising a sump having at least two interior chambers, said chambers being separated from one another by one or more partitions disposed interiorly of said sump, said at least two chambers being in fluid communication with one another at a common nozzle, and means for supplying molten solder under pressure to said chambers, the pressure at which said solder is supplied to at least one of said chambers being different from the pressure at which said solder is supplied to the remaining chambers.

2. In a wave soldering system as claimed in claim 1, wherein said nozzle comprises an elongated slot, and said vertical partitions are aligned substantially parallel to said slot.

3. In a wave soldering system as claimed in claim 1, wherein said chambers are separated from one another by one or more substantially vertical partitions disposed interiorly of said sump.

4. A wave soldering system comprising;
- a container for holding a supply of molten solder, said container including a first reservoir compartment for holding a portion of said solder supply at a first liquid level, and a second reservoir compartment, said second reservoir compartment comprising at least two sub-compartments for holding portions of said solder supply at at least two liquid levels above said first liquid level;
- a sump and nozzle positioned in said first reservoir compartment so that said sump is partially submerged when said supply of molten solder therein is at said first liquid level, said nozzle will be disposed above said first liquid level but below said other liquid levels, said sump comprising at least two interior chambers separated from one another within said sump;
- a plurality of conduit means, each of said means having an inlet disposed in one of said sub-compartments and a outlet disposed in one of said sump chambers for carrying flows of molten solder between said sub-compartments and said sump; and
- means for transferring molten solder from said first reservoir compartment into said second reservoir compartment so as to maintain said liquid levels in said second reservoir compartment.

5. A soldering system as claimed in claim 4 wherein said sub-compartments are separated from one another by one or more common walls of varying heights.

6. A soldering system as claimed in claim 5 wherein said means for transferring includes a pump having an inlet in said first reservoir compartment, and a conduit having an inlet communicating with the pump outlet, and an outlet disposed in that sub-compartment which has the highest liquid level.

7. A soldering system as claimed in claim 6 wherein said conduit outlet in said sub-compartment is disposed vertically above said conduit inlet in said sub-compartment.

8. A soldering system as claimed in claim 4 including means for returning overflow molten solder from that sub-compartment which has the lowest liquid level directly to said first reservoir compartment.

9. A soldering system as claimed in claim 4 wherein said second reservoir compartment is disposed within said first reservoir compartment.

10. A soldering system as claimed in claim 4 wherein said reservoir compartment is formed integrally with said first reservoir compartment, and including one or more common walls separating said first and second compartments.

11. In a method of mass soldering electrical components to a circuit board by passing the underside of said board in contact with the upper surface of a standing wave of molten solder, the improvement comprising combining a plurality of streams of molten solder, at least one of said streams being at a pressure different from others of said plurality, to form said standing wave with a substantially horizontal crest and differential pressures within said wave.

12. In a method as claimed in claim 11, wherein said wave has a flow path which is, in major part substantially uni-directional, and a wave form shape which is highest adjacent its rear.

* * * * *

UNITED STATES PATENT OFFICE
CERTIFICATE OF CORRECTION

Patent No. 3,993,235        Dated November 23, 1976

Inventor(s) Kenneth G. Boynton

It is certified that error appears in the above-identified patent and that said Letters Patent are hereby corrected as shown below:

Column 4, line 35, "claim 3" should read -- claim 1 --.

Signed and Sealed this

Eighth Day of March 1977

[SEAL]

Attest:

RUTH C. MASON
*Attesting Officer*

C. MARSHALL DANN
*Commissioner of Patents and Trademarks*